United States Patent [19]

Tomlinson et al.

[11] 4,378,975

[45] Apr. 5, 1983

[54] ABRASIVE PRODUCT

[76] Inventors: Peter N. Tomlinson, 315 Enford Rd., Mondeor, Transvaal; Aulette Davies, 45 Arend Ave., Randpark Ext. 5, Randburg, Transvaal, both of South Africa

[21] Appl. No.: 292,124

[22] Filed: Aug. 12, 1981

[30] Foreign Application Priority Data

Aug. 14, 1980 [ZA] South Africa ............... 80/4996
Nov. 26, 1980 [ZA] South Africa ............... 80/7383

[51] Int. Cl.³ .................................... B24D 3/02
[52] U.S. Cl. ................................ 51/309; 51/307
[58] Field of Search ............................. 51/307, 309

[56] References Cited

U.S. PATENT DOCUMENTS

| Re. 26,879 | 5/1970 | Kelso | 51/309 |
|---|---|---|---|
| 3,293,012 | 12/1966 | Smiley et al. | 51/293 |
| 3,306,720 | 2/1967 | Darrow | 51/309 |
| 3,316,073 | 4/1967 | Kelso | 51/309 |
| 3,372,010 | 3/1968 | Parsons | 51/309 |
| 3,596,649 | 8/1971 | Olivieri | 51/309 |
| 4,128,136 | 12/1978 | Generoux | 51/309 |
| 4,136,230 | 1/1979 | Patel | 428/564 |

FOREIGN PATENT DOCUMENTS

| 12631 | 6/1980 | European Pat. Off. |
|---|---|---|
| 1577566 | 1/1971 | Fed. Rep. of Germany |
| 1216428 | 12/1970 | United Kingdom |
| 1349385 | 4/1974 | United Kingdom |
| 1489130 | 10/1977 | United Kingdom |
| 1500709 | 2/1978 | United Kingdom |

OTHER PUBLICATIONS

"Metals Handbook", Eight ed., vol. 1, pp. 820–821.

*Primary Examiner*—Donald E. Czaja
*Assistant Examiner*—W. Thompson
*Attorney, Agent, or Firm*—Cushman, Darby & Cushman

[57] ABSTRACT

The invention provides an abrasive body which will generally be of cylindrical shape comprising a plurality of superhard abrasive particles such as diamond bonded together by means of a tough wear-resistant nickel based alloy having a melting point of below 1000° C. These alloys are known as hard facing alloys. The abrasive bodies may be used as inserts for drill crowns. The bodies are made by mixing the abrasive particles with the alloy in powdered form, producing a green-state, coherent body from the mixture, generally by cold pressing, and sintering the green-state product under conditions which inhibit degradation of the abrasive particle.

10 Claims, 6 Drawing Figures

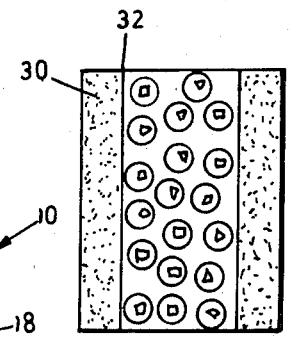
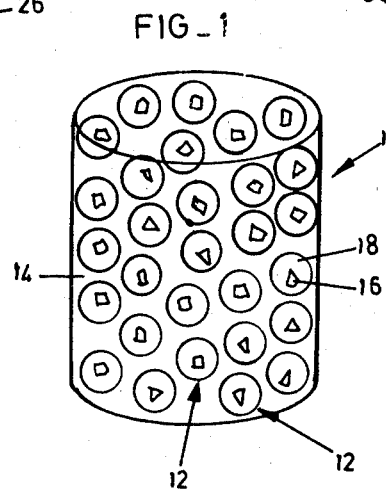
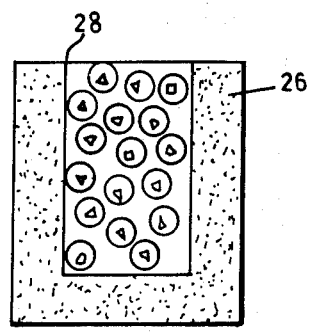
FIG_4  FIG_1  FIG_5
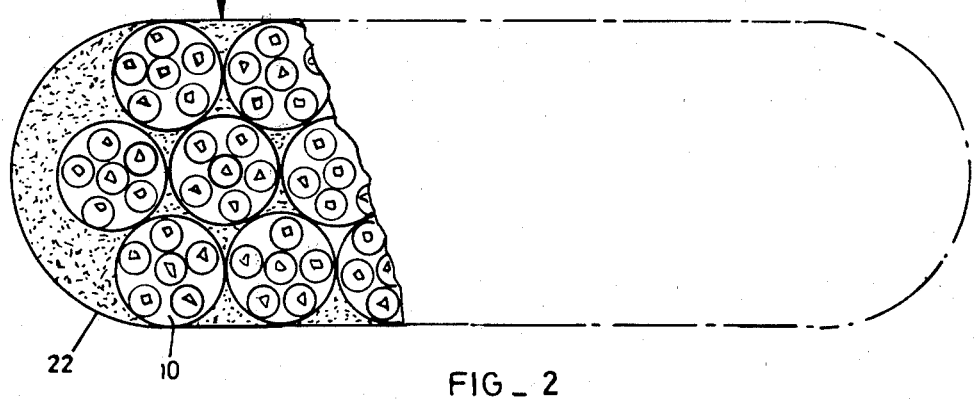
FIG_2
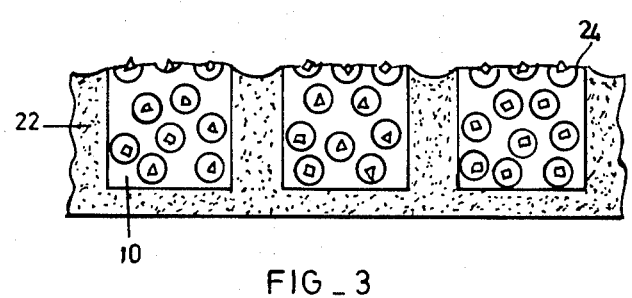
FIG_3
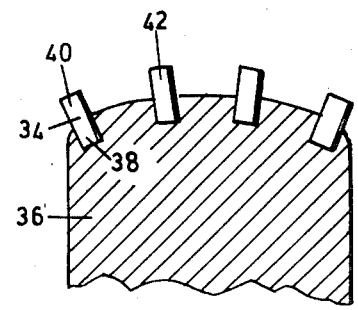
FIG_6

ABRASIVE PRODUCT

This invention relates to an abrasive product and more particularly to an abrasive product in which the abrasive is a superhard abrasive such as diamond or cubic boron nitride.

Abrasive compact tool inserts are manufactured and sold extensively for the machining of a variety of metals such as cemented carbide and hard alloy steels. These tool inserts generally consist of the abrasive compact which may be a diamond or a cubic boron nitride abrasive compact mounted on a support backing which is typically a cemented, or metal bonded, carbide. The abrasive compacts are made under high temperature and pressure conditions in the presence of a catalyst or solvent for the abrasive particle used which results in intergrowth between the particles. The abrasive compacts are therefore polycrystalline masses of the abrasive particle used. The inserts are tough and very hard and perform abrading functions admirably. However, because of their content and conditions of manufacture, they tend to be expensive.

Examples of patent specifications describing such products are British specification 1,349,385 and British specification 1,489,130.

Also used extensively in industry are metal bonded abrasive wheels. Such wheels comprise a hub having a peripheral grinding portion consisting of a plurality of abrasive particles held in a suitable metal matrix. An example of a suitable metal matrix is bronze.

According to the present invention, there is provided an abrasive body comprising a plurality of superhard abrasive particles bonded together by means of a tough wear-resistant bonding alloy having a melting point below 1100° C. and containing 65 to 90 percent by weight nickel and 5 to 15 percent by weight chromium. The alloy optionally contains 2 to 5 percent by weight boron, silicon and other minor constituents such as carbon, molybdenum and iron. Such alloys are known in the art as hard facing alloys. They are tough, wear- and corrosion-resistant nickel based alloys. Examples of such alloys can be found in the book "Metals Handbook" Eighth Edition, Vol. 1, pages 820 and 821.

The abrasive particles may be diamond particles or cubic boron nitride particles. They are preferably diamond particles. The abrasive particles are generally fairly large having a size of 200 microns or larger. In the case of diamond such particles will be of the saw diamond type which have a blocky, well-defined cubo-octahedral form.

The abrasive particles may be provided with a thin metal coating, for example provided in an amount of up to 10% by weight of the coated particle. The metal coating is preferably a chromium coating and may be applied to the abrasive by methods such as vacuum sputtering, vapour deposition and other methods well known in the art.

The abrasive particle may form part of a substantially spherical pellet, that is a pellet having the abrasive particle as its core and an outer wear-resistant coating around the core. The wear-resistant coating may be a tough wear-resistant alloy such as a nickel/iron based alloy or a hard facing alloy as described above, or a metal bonded carbide, a metal bonded nitride, a metal bonded boride or a metal bonded silicon carbide. The outer diameter of the pellet will typically be in the range 2 to 3 times the particle size. Methods of making such pellets are known in the art. For example, suitable methods are described in U.S. Pat. No. Re 26,879 and European Patent Publication No. 0012631.

Where the abrasive particle is provided in pelletised form, the concentration of abrasive particle in the body will generally be in the range 10 to 25% by volume. Where the abrasive particle is provided in non-pelletised form, higher concentrations, e.g. up to 40% by volume, may be used.

The abrasive body will typically be cylindrical, conical, dome or triangular in shape, preferably substantially right-circular cylindrical in shape. The overall dimensions of the abrasive body will vary according to the application to which it is put. Typically the largest dimension of the body is in the range 5 to 15 mm.

The abrasive body may be encased in a surround of metal bonded carbide. This surround may be provided to protect an abrading edge of the abrasive body. The surround, when provided, may be bonded to the abrasive body during its manufacture. Alternatively, the abrasive body after manufacture may be pressed into a pre-formed surround.

The abrasive bodies of the invention will provide a surface or edge which will perform the abrading function in use. The abrasive bodies may be used as inserts for tools such as drill crowns, drill bits and mining picks. The inserts may be mounted in the tool in the conventional manner so as to present an abrading surface or edge.

The abrasive bodies may form part of a larger abrasive body which itself can be used for drilling, cutting, grinding and other abrasive operations. Such a body will comprise a plurality of abrasive bodies as described above bonded together by means of a suitable metal matrix. The abrasive bodies will preferably have a cylindrical shape so that a plurality thereof can be closely packed and then bonded together by means of the metal matrix. The metal matrix is preferably a metal which is softer than, and will alloy with, the alloy of the abrasive bodies. An example of such a metal is cobalt. This larger abrasive body may be made by packing a plurality of the abrasive bodies in a mould, filling the spaces between the bodies with a powdered metal, hot pressing the bodies and metal, or cold pressing followed by sintering, and then removing the formed product from the mould.

The abrasive bodies of the invention may be made by a method which comprises the steps of mixing the abrasive particles with the alloy in powdered form, producing a green-state, coherent body from the mixture and sintering the green-state product under conditions which inhibit degradation of the abrasive particle. This method forms another aspect of the invention.

After mixing, the abrasive particles and the alloy are formed into a green-state, coherent body. This means that a coherent body is produced, but one which has no real strength. This body may be produced by placing the mixture in a suitable mould and then applying pressure to the mixture at ambient temperature. Typically the pressure applied will be at least 400 mPa. Some heat may be applied to the mixture during pressure application, but the pressure is usually applied at ambient temperature.

The green-state product is then sintered to produce the final body. What is produced after sintering is an abrasive body in which individual, discrete abrasive particles are bonded together by the alloy. The body is not an intergrown, polycrystalline mass as in the case of abrasive compacts of the type described in British Pat. No. 1,349,385 and British Patent Specification No. 1,489,130.

The sintering must take place under conditions which inhibit degradation of the abrasive particle. Such conditions are known in the art. In the case of diamonds, the sintering preferably takes place at a temperature below 1000° C. in a non-oxidising atmosphere. The non-oxidising atmosphere is typically a vacuum of $10^{-4}$ Torr or higher. For the higher melting alloys, powdered solder may be added to the starting mixture to reduce the melting point of the alloy.

Embodiments of the invention will now be described with reference to the accompanying drawings in which:

FIG. 1 is a perspective view of an abrasive body of the invention;

FIG. 2 is a plan view of a portion of an abrasive product utilising a plurality of abrasive bodies of FIG. 1;

FIG. 3 is a side view of a portion of the abrasive product;

FIG. 4 is a cross-section of another embodiment of the abrasive body;

FIG. 5 is a cross-section of yet another embodiment of the abrasive body, and

FIG. 6 illustrates the mounting of a plurality of abrasive bodies in a drill crown.

Referring to FIG. 1, there is shown an abrasive body 10 of cylindrical shape comprising a plurality of pelletised abrasive particles 12 bonded together by means of a bonding alloy matrix 14. Each pellet 12 consists of an abrasive core 16 and a wear-resistant coating 18.

The cylindrical abrasive body of FIG. 1 may be used to produce an abrasive product of the type illustrated by FIGS. 2 and 3. Referring to these Figures, there is shown an abrasive product 20 comprising a plurality of closely packed abrasive bodies 10 bonded together by means of a matrix 22. The product has been found to be excellent in the drilling of hard rock.

The exposed abrasive particles in surface 24 (see FIG. 3) perform the abrasive function. The alloy coating holds the particles firmly to the bonding matrix 14 which in turn bonds firmly to the matrix 22. If the matrix 22 is softer than the matrix 14, which is preferred, it has been found that this leads to better surface integrity, coolant flow, swarf clearance and shock absorbance.

The abrasive body of FIG. 4 is the same as that of FIG. 1 save that it is firmly secured in a cup 26 of cemented carbide e.g. by brazing. The cemented carbide cup protects the leading edge 28 of the body for example, against premature wear.

The abrasive body of FIG. 5 is provided with a surrounding sleeve 30 of cemented carbide which protects the cutting edge 32 of the body.

FIG. 6 illustrates the mounting of a plurality of abrasive bodies 34 in a drill crown 36. Each abrasive body 34 has one end 38 firmly embedded in the drill crown and the opposite end 40 exposed and presenting cutting surface 42.

The invention is further illustrated with reference to the following examples.

EXAMPLE 1

A mass of saw diamond abrasive particles having a particle size in the range 250 to 297 microns was mixed with powdered chromium in ratio of 10 parts chromium to 1 part diamond on a weight basis. The diamond/chromium mixture was heat treated at a temperature of 900° C. for 30 minutes in a vacuum of $10^{-4}$ Torr. This caused a 1 to 3 percent by weight coating of chomium to deposit on the diamond particles which were removed by screening.

The chromium coated diamond particles were pelletised using a copper/hard facing alloy wear-resistant coating. The ratio of copper to alloy was 1:1 on a weight basis and the hard facing alloy had the following composition (percentages by weight):

Cr—7,05%
B—2,98%
Si—4,6%
Ni-balance

The pelletising was achieved by placing the chromium coated particles in a pelletiser of the type described in U.S. Pat. No. Re 26,879 and a mixture of the powdered copper/hard facing alloy fed to the pelletiser with the addition of alcohol and camphor. This was continued until green pellets having a diameter of approximately double the abrasive particle size had been formed. The green pellets were dried and then sintered in an argon atmosphere for 8 minutes at 900° C.

The sintered product consisted of discrete, substantially spherical and extremely hard pellets.

A quantity of the pellets was mixed with a powdered mixture of hard facing alloy and a solder. The mixture of alloy and solder comprised 90 percent by weight alloy and 10 percent by weight solder. The alloy and solder had the following compositions:

Alloy: As above.
Solder: 51% copper; 14% silver; 35% zinc. (percentages by weight).

The solder was provided in order to achieve better bonding of the alloy to the pellets and flow characteristics for the mixture during sintering.

The mixture of pellets, alloy and solder had added to it glycerine as a binder. The mixture was then placed in a suitable mould and cold pressed to a load of 500 mPa. A green-state, coherent body was produced.

The green-state, coherent body was then sintered in a vacuum of $10^{-5}$ Torr at 960° C. for 30 minutes.

The sintered body had a diamond concentration of 15% by volume.

The sintered body had a right-circular cylindrical shape as illustrated by FIG. 1. A plurality of these abrasive bodies were mounted in a drill crown as illustrated by FIG. 6. The drill crown was found to have excellent drilling capabilities.

EXAMPLE 2

A mass of chromium coated saw diamond abrasive particles was produced in the manner described in Example 1.

The chromium coated diamond particles were mixed with powdered copper/hard facing alloy as in Example 1. To the powdered mixture was added a minor amount of powdered tungsten carbide.

Glycerine was added to the mixture as a binder and then the mixture was cold pressed to produce a green-state, coherent body as described in Example 1. The green-state, coherent body was sintered at a temperature of 980° C. in a vacuum of $10^{-5}$ Torr for 30 minutes.

The sintered body produced had a shape as illustrated in FIG. 1 and a diamond concentration of 25% by volume. A plurality of the bodies were mounted in a drill crown as illustrated by FIG. 6. The drill crown was found to have excellent drilling capabilities.

EXAMPLE 3

A plurality of abrasive bodies as produced in Example 2 were used to produce an abrasive product of the type illustrated by FIGS. 2 and 3. The abrasive bodies were closely packed in a suitable mould with powdered cobalt filling the spaces between each body. The contents of the mould were then sintered at 950° C. for a period of 30 minutes. Recovered from the mould was a product which could be mounted on the rim of a core drill or used as such for abrading operations.

We claim:

1. A tool insert comprising a plurality of discrete chromium-coated diamond particles bonded together by means of a tough wear-resistant bonding alloy having a melting point below 1100° C. and containing 65 to 90 percent by weight nickel and 5 to 15 percent by weight chromium, the concentration of diamond particles being in the range 10 to 40 percent by volume of the insert and the chromium coating being provided in an amount of up to 10 percent by weight coated particle.

2. A tool insert according to claim 1 wherein the alloy contains 2 to 5 percent by weight boron or silicon.

3. A tool insert according to claim 1 wherein the abrasive particles are 200 microns or larger.

4. A tool insert according to claim 1 which has a cylindrical, conical, dome or triangular shape.

5. A tool insert according to claim 4 which has a substantially right-circular cylindrical shape.

6. A tool insert according to claim 4 the largest dimension of which is 5 to 15 mm.

7. A method of making a tool insert comprising a plurality of discrete chromium-coated diamond particles bonded together by means of a tough wear-resistant bonding alloy having a melting point below 1100° C. and containing 65 to 90 percent by weight nickel and 5 to 15 percent by weight chromium, the concentration of diamond particles being in the range 10 to 40 percent by volume of the insert and the chromium coating being provided in an amount of up to 10 percent by weight of the coated particle, including the steps of mixing the chromium-coated diamond particles with the alloy in powdered form, producing a green state, coherent body from the mixture and sintering the green-state product under conditions which inhibit degradation of the diamond particles.

8. A method according to claim 7 wherein the green-state, coherent body is produced by placing the mixture in a mould and applying pressure to the mixture at ambient temperature.

9. A method according to claim 8 wherein the pressure applied is at least 400 mPa.

10. A method according to claim 8 wherein the sintering takes place at a temperature below 1000° C. in a non-oxidising atmosphere.

* * * * *